Patented Jan. 13, 1948

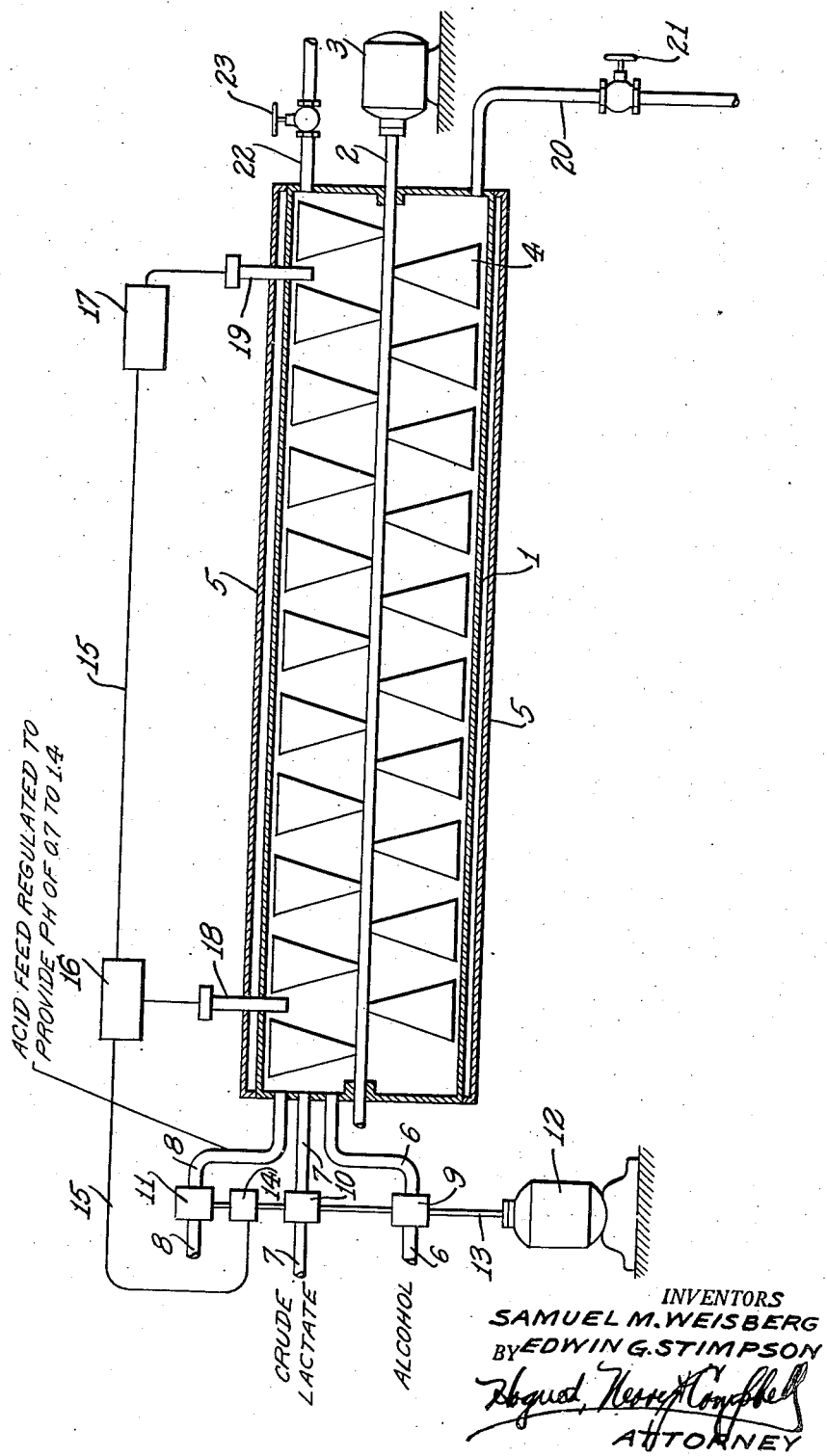

2,434,300

UNITED STATES PATENT OFFICE 2,434,300

ESTERIFICATION OF ALKALI METAL AND ALKALINE EARTH METAL LACTATES UNDER CONTROLLED pH CONDITIONS TO FORM ALKYL LACTATES

Samuel M. Weisberg and Edwin G. Stimpson, Baltimore, Md., assignors, by mesne assignments, to National Dairy Research Laboratories, Inc., New York, N. Y., a corporation of Delaware Application November 1, 1945, Serial No. 626,120

3 Claims. (Cl. 260—484)

This invention relates to a process of making water soluble esters of lactic acid and more particularly to the manufacture of the same from crude lactate salts under carefully controlled conditions of esterification.

This application contains subject matter common to application Serial No. 468,184, filed December 8, 1942.

Water soluble esters of lacetic acid, for example, methyl, ethyl, and iso-propyl lactates, are in great demand and it is desirable to produce these good yields in large quantities. Quite different problems are involved in their manufacture than are present in making the water insoluble lactates, such as butyl lactate.

It is an object of the invention to provide a commercially practical method of obtaining water soluble esters of lactic acid from crude alkali metal and alkaline earth metal lactates in high yields.

More particularly it is an object of the invention to provide a process of esterifying said crude lactates with an excess of alcohol and with a carefully controlled amount of a mineral acid, the excess of which is regulated to provide a maximum pH value.

The crude lactates are prepared by fermenting a carbohydrate to form lactic acid and neutralizing the lactic acid as it is formed with an alkaline reacting alkali metal or alkaline earth compound. One source of the crude lactate salts is the fermentation of whey, which is a residue from the manufacture of casein and various cheeses. Similar processes may be applied to grains and other carbohydrates.

In the manufacture of crude lactates from whey, the whey is inoculated with the appropriate culture and the fermentation proceeds, converting the lactose in the whey to lactic acid. At periodic intervals as the acid develops, a neutralizing compound is added, such as lime, limestone, caustic potash or soda or soda ash, so as to maintain a pH value which is optimum for conditions of fermentation. After all of the lactose has been converted into lactic acid and neutralized to form the lactate salt, the solution is treated in various ways in an attempt to reduce as much as possible the various impurities in the solution. These impurities include various phosphates, soluble proteinaceous substances and other organic materials. For example, the solution may be rendered highly alkaline and heated to the boiling point in an effort to coagulate and precipitate proteins and phosphates. It may be treated with a filter aid and filtered or with activated carbon, for the purpose of improving color and precipitating as many of the impurities as possible. The extent to which the original fermented and neutralized solution can be purified varies with the source of the carbohydrate and the facilities for treating the solution. Despite such treatments, a relatively large amount of impurities other than the lactate salt remain in solution.

It is then sent to a vacuum evaporating pan and the moisture reduced so that the water content is some 20 to 70%. This material could be reprocessed and recrystallized to purify it in various ways, but the crude sodium lactate, as this term is used in the application, refers to the concentrated mother liquor containing all of the impurities that cannot be removed by the appropriate treatments of the initial mother liquor in which the fermentation is carried out. Crude sodium lactate and crude calcium lactate are the principal products made commercially because lime and soda are the least expensive materials for neutralizing and fermentations. These crude materials are well known in the art.

The raw materials may vary from day to day because of variations in the supply of milk and whey, even though produced continuously in a single plant. Crude lactates are regarded as a material that is not standardized as to composition and for this reason it is inexpensive. The ability of the process of the invention to utilize the crude lactate as a source material permits the production of lactic acid esters economically on a large scale.

The amount of water in the crude lactate is not important in so far as the invention is concerned, but rather the phosphate and proteinaceous impurities in the crude lactate which have been described above and which are well known in the art to be present in material of the *crude* grade. If desired, the crude lactate may be concentrated to produce a nearly water-free material. However, as the water content of sodium lactate is reduced below about 80% the product becomes more difficult to handle. The extent of the dehydration is not critical for reasons which will become apparent hereinafter, and the process of the invention may utilize anhydrous crude lactate salts although these may be difficult to handle because of their very viscous nature, or because they are solids. Generally it is preferred to have sufficient water to assure that they will be in a pumpable form at the reaction temperature.

In general, the method of the invention includes esterifying a crude alkali metal or alkaline earth metal lactate with a lower alcohol the lactate ester of which is water soluble, such as for example methyl, ethyl, and iso-propyl alcohols, in the presence of a strong mineral acid. The reaction at least theoretically may be considered as follows:

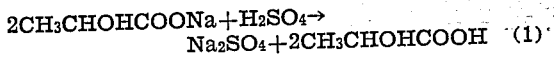

$$2CH_3CHOHCOONa + H_2SO_4 \rightarrow Na_2SO_4 + 2CH_3CHOHCOOH \quad (1)$$

This reaction takes place substantially instantaneously and is irreversible as the sodium sulfate is insoluble in the methanol.

The lactic acid then reacts with the methanol according to the following equation:

$$CH_3OH + CH_3CHOHCOOH \rightleftarrows CH_3CHOHCOOCH_3 + H_2O \quad (2)$$

This reaction is not instantaneous and is reversible. In order to get high yields of the ester and shift the equilibrium in this direction, it has been proposed to use an excess of the alcohol, to remove the water from the reaction mixture, and various other expedients. In utilizing a crude lactate as the starting material, however, the problem is not so simple because of complications introduced by impurities in the crude salt.

Theoretical considerations would indicate that the reaction would be dependent upon an excess of one of the components which pushes in the equilibrium reaction towards ester formation or through the removal of one of the reaction products which is responsible for the prevention of the reaction going to completion.

From theoretical considerations at least it would appear that an excess of acid is not required over and above that to transform the sodium in the lactate salt to sodium salt of the acid. For example, it would seem possible to analyze a sample of the crude lactate for sodium content, and knowing this, to determine the amount of sulfuric acid required for stoichiometric combination to form sodium sulphate. It has been found, however, that this is not an accurate criterion because of the buffering effect of the impurities and the variations in the raw material. Phosphates are usually one of the components present in the crude lactate in varying amounts and are well known for their buffering action. Because of the action of the various impurities, it has been discovered that the amount of acid to be added for optimum yields may vary independent of the lactate content and cannot be determined from an analysis of the raw material.

It has been discovered, in accordance with the invention, that the acid should be present so as to establish optimum hydrogen ion concentration which may be determined and expressed as a pH value. More particularly, the amount of acid to be added is such as to provide a pH value for the reaction mixture of not over 1.4. It has been found that irrespective of the variations in the crude lactate and variations in the stoichiometric excess of acid required to produce this pH value, the optimum yields of the ester are obtained when the amount of acid is controlled in this manner.

This method of control by means of hydrogen ion concentration is to be distinguished from prior proposals in which the amount of acid is expressed in terms of per cent and calculated by titrimetric determinations. This latter method is indefinite and unsatisfactory because of the varying composition of the crude raw material, the varying amounts of water present, and other factors that can not be readily ascertained or controlled except in terms of the proper hydrogen ion concentration, which we have discovered is the cause of the reaction going to completion.

In practicing the invention, any strong mineral acid may be used, but sulfuric acid is preferred in view of the fact that this is readily available and inexpensive. It would generally be used in the practice of a commercial embodiment of the invention for these reasons and it is described as illustrative.

Contrary to what might be expected, from the above considerations, it has also been discovered that the acid cannot be increased beyond a certain point without reducing the over-all yield. Generally it has been found that a pH value of less than 0.7 may not be maintained without substantially reducing the yield. It is preferred, for economic reasons, not to go below a pH of 1.0 but if the pH value is not important, the pH value may go as low as 0.7.

The pH value within the range of 0.7 to 1.4, and preferably 1.0 to 1.4, is critical, irrespective of reaction conditions, such as the amount of excess alcohol and the temperature used and the mechanical expedients employed for bringing the materials together and separating the reaction product. The preferred reaction conditions are about 140° to 175° F., where the reaction under the controlled pH conditions is reasonably short at 140° F. and substantially instantaneous at 160° F. or above.

The amount of alcohol used preferably varies from between 3 parts to 6 parts by weight for each part of the lactate salt calculated on the 100% basis. The optimum ratio, considering thermal economics involved in the distillation, is about 4 to 1. When less than 3 parts by weight of alcohol are used the reduced yield is such as not to justify using the smaller amount. When more than 6 parts by weight of alcohol are used the excess alcohol serves no useful purpose and must be removed by distillation later. For any given amount of alcohol used, however, the optimum amount of acid to produce the hydrogen ion concentration giving a pH value within the above range is employed. For example, if operating conditions and economics indicate the use of less than 3 parts of alcohol to 1 part of the lactate salt, the optimum yield when these proportions of alcohol and lactate salt are used will be obtained when a pH value is maintained within the range indicated.

As illustrative of the process employed, the attached drawing represents a flow sheet and a diagrammatic illustration of form of apparatus suitable for accomplishing the esterification.

A reaction chamber generally indicated at 1 may be mounted to have a shaft 2 rotatable therein by means of a motor 3. Attached to the shaft within the reactor 1 are appropriate vanes, paddles or other agitating means 4. The reactor may be provided with a jacket 5, if desired, wherein steam or other heating medium may be admitted for the purpose of reacting the mixture at the desired temperature. The alcohol may be introduced through a conduit 6, the crude lactate salt through the conduit 7 and the acid through the conduit 8. Each of these raw materials entering into the reaction may be metered and pumped by appropraite pumps 9, 10 and 11, respectively, and the pumps 9 and 10 may be driven, for example, to introduce 3 to 6 parts by weight of alcohol to 1 part of the crude lactate salt. The pump 11 which controls the introduction of acid through the conduit 8 may be operated by a suitable regulating means 14 whish is controlled by electrical, pneumatic or other operating means 15 which interconnects the control 14 which pH meters 16 and 17. Suitable pH electrodes 18 and 19 may project into the reaction mixture.

Assuming the process to be operated in equilibrium, the crude lactate may vary in impurities or water content so as to cause the pH value to rise above the optimum value of 1.4. This is detected by the pH electrode 18 and registered on a reading and recording meter 16. By means of appropriate electrical connections 15, the control 14 will operate to increase the rate of action of the pump 11 and increase the amount of acid. The control 14 may be in the form of a variable gear mechanism or other adjustable means for operating the speed of the pump 11 in relation to the pH reading on the meter 16. The details of such mechanical facilities will be readily apparent to those skilled in the art. The invention is not concerned with apparatus and could be carried out by hand. As the reaction mixture proceeds through the reactor 1 the pH may change, due to the delayed action of buffering impurities and other conditions which do ont manifest themselves immediately so that the pH value of the mixture at the end may be other than the optimum amount. For this reason it may be desirble to provide an additional pH electrode 19 near the end of the reaction chamber and this may operate to superimpose the reading of this electrode upon the control so that the final mixture has the optimum pH value. The reaction mixture may be withdrawn through the conduit 20 and the ester separated therefrom by appropriate distillation means.

The exact conditions of the reaction are not critical. For instance, the entire reaction may be carried out at room temperature and the reaction mixture exiting through the conduit 20 may then be subjected to flash distillation operations. Under such conditions the reaction may not go to completion until subjected to the higher temperatures utilized in the distillation. However, the pH value will have been adjusted in the reaction mixture so as to result in optimum yields when the mixture is finally subjected to the desired temperature. Alternatively the reactor 1 heated to an elevated temperature and may be under superatmospheric pressure because the temperature may be above the boiling point of the alcohol or other components of the reaction mixture. Under such circumstances the conduit 20 will contain a release valve 21 and the mixture will be flashed through the valve 23 into a distillation zone and supplemental heat added to complete the reaction.

Alternatively the reactor 1 may be in the form of a combined reaction chamber and still and may be maintained at a high temperature so that the reaction takes place and the products vaporized in substantially a simultaneous and continuous operation. In this event, vapor will be taken off through the conduit 22 and the residue of sodium sulphate and other unvaporized materials may be withdrawn through the conduit 20.

The vapor evaporated from the reaction mixture will comprise primarily the excess of alcohol, the lactate ester, and the water formed during the reaction or present in any of the raw materials, particularly the crude sodium lactate. These can be separated by appropriate distillation techniques which are described elsewhere.

It will be apparent that the invention is adapted to a variety of mechanical and procedural modifications and may use the various raw materials indicated heretofore. All such variations are intended to be within the scope of the claims, provided the reaction is carried out with a crude lactate and with an amount of a strong mineral acid to provide the critical pH value of the reaction mixture, as specified within the following claims.

We claim:

1. A method of manufacturing methyl lactate from crude sodium lactate obtained by concentrating fermentation liquor containing sodium lactate and residual impurities; which comprises reacting one part of said crude sodium lactate with 3 to 6 parts (based on 100% lactate) of methyl alcohol in the presence of sulfuric acid; measuring the pH value of the reaction mixture and adjusting the amount of sulfuric acid added to the reaction mixture to maintain the pH value within the range of 1.0 to 1.4 substantially throughout and at the end of the reaction, irrespective of the amount and nature of said residual impurities; continuing the reaction at a temperature in the range of 140° to 175° F.; and separating the volatile components from the non-volatile residue.

2. A method of manufacturing methyl lactate from crude calcium lactate obtained by concentrating fermentation liquor containing calcium lactate and residual impurities; which comprises reacting one part of said crude calcium lactate with 3 to 6 parts (based on 100% lactate) of methyl alcohol, in the presence of sulfuric acid; measuring the pH value of the reaction mixture and adjusting the amount of sulfuric acid added to the reaction mixture to maintain the pH value within the range of 1.0 to 1.4 substantially throughout and at the end of the reaction, irrespective of the amount and nature of said residual impurities; continuing the reaction at a temperature in the range of 140° to 175° F.; and separating the volatile components from the non-volatile residue.

3. A method of manufacturing water-soluble esters of lactic acid from crude alkali and alkaline earth metal lactate salts obtained by concentrating fermentation liquor containing said lactate salt and residual impurities; which comprises reacting one part of said crude lactate salt with a stoichiometric excess of an alcohol, the lactate ester of which is water-soluble, in the presence of sulfuric acid; measuring the pH value of the reaction mixture and adjusting the amount of sulfuric acid added to the reaction mixture to maintain the pH value within the range of 0.7 to 1.4 substantially throughout and at the end of the reaction, irrespective of the amount and nature of said residual impurities; and separating the volatile components from the non-volatile residue.

SAMUEL M. WEISBERG.
EDWIN G. STIMPSON.

(References on following page)

REFERENCES CITED

The following references are of record in the file of this patent:

UNITED STATES PATENTS

| Number | Name | Date |
|---|---|---|
| 2,290,926 | Weisberg et al. | July 28, 1942 |
| 2,029,694 | Bannister | Feb. 4, 1936 |

FOREIGN PATENTS

| Number | Country | Date |
|---|---|---|
| 171,835 | Germany | Mar. 25, 1905 |

OTHER REFERENCES

Thorpe, "Dict. of Applied Chemistry" (1928), vol. V, p. 9.

Certificate of Correction

Patent No. 2,434,300.  January 13, 1948.

SAMUEL M. WEISBERG ET AL.

It is hereby certified that errors appear in the printed specification of the above numbered patent requiring correction as follows: Column 1, line 9, for "lacetic" read *lactic*; column 2, line 28, for the words "neutralizing and" read *neutralizing the*; column 5, line 5, for "appropraite" read *appropriate*; line 11, for "whish" read *which*; line 13, for "which" read *with*; line 35, for "ont" read *not*; column 8, list of references cited, under the heading "OTHER REFERENCES," last line thereof, for "vol. V" read *vol. IV*; and that the said Letters Patent should be read with these corrections therein that the same may conform to the record of the case in the Patent Office.

Signed and sealed this 30th day of March, A. D. 1948.

[SEAL]

THOMAS F. MURPHY,
*Assistant Commissioner of Patents.*